Figure 1:
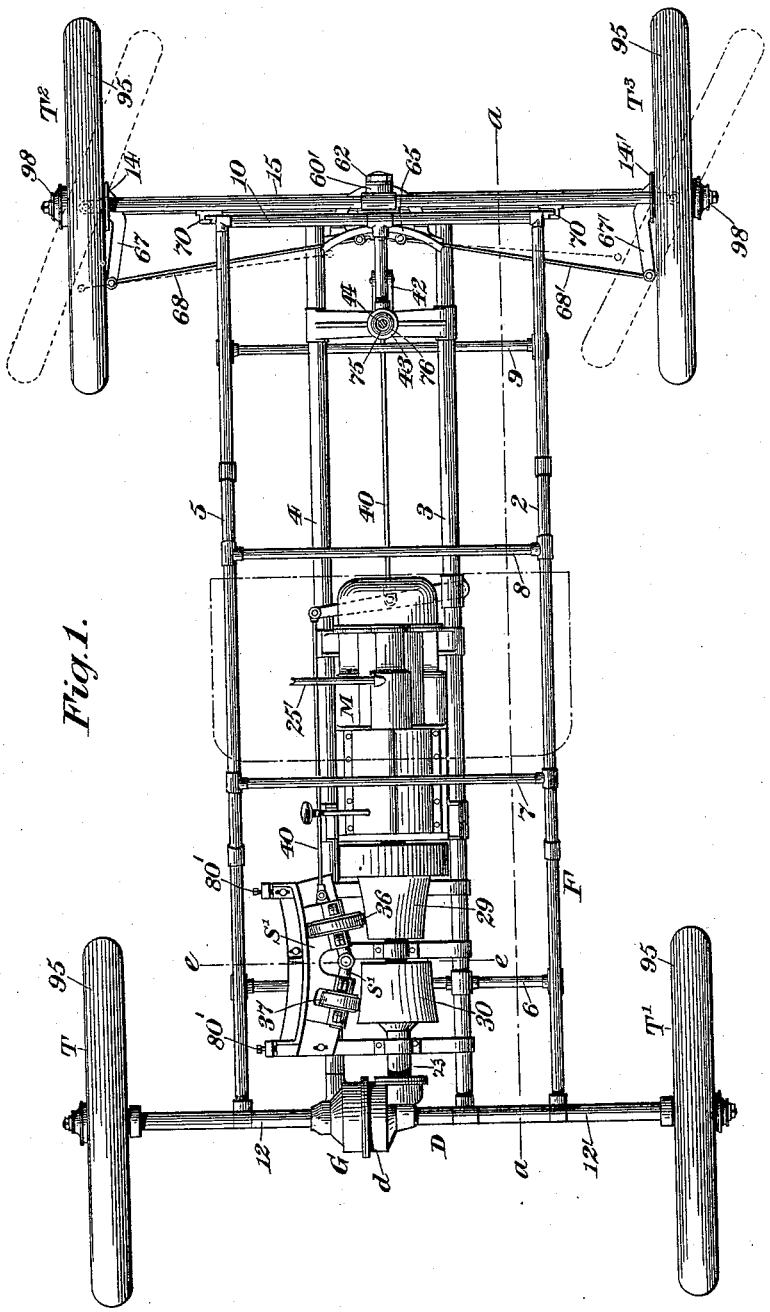

(No Model.) 5 Sheets—Sheet 1.

H. C. BAKER.
MOTOR VEHICLE.

No. 583,018. Patented May 25, 1897.

Witnesses:
J. L. Edwards Jr.
Fred. J. Dole.

Inventor:
Hurbert C. Baker:
By his Attorney,
F. H. Richards.

(No Model.) 5 Sheets—Sheet 2.

H. C. BAKER.
MOTOR VEHICLE.

No. 583,018. Patented May 25, 1897.

Witnesses:
J. L. Edwards Jr.
Fred. J. Dole.

Inventor:
Hurbert C. Baker.
By his Attorney,
F. H. Richards.

(No Model.) 5 Sheets—Sheet 3.
H. C. BAKER.
MOTOR VEHICLE.
No. 583,018. Patented May 25, 1897.
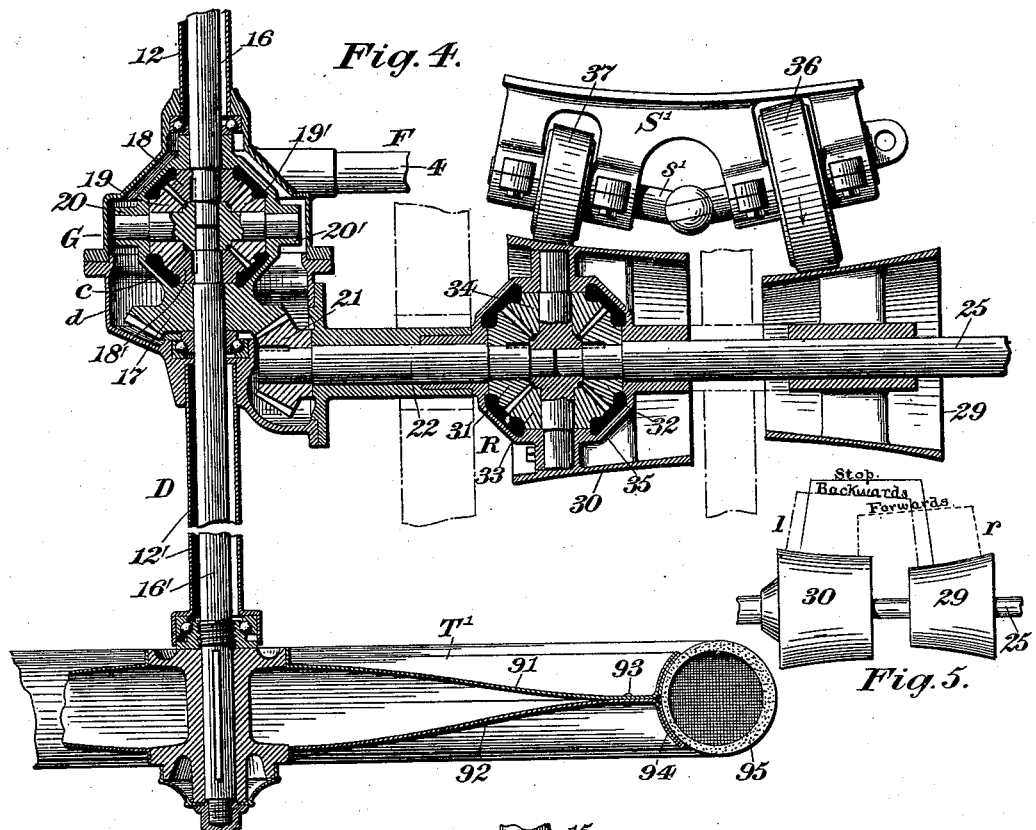
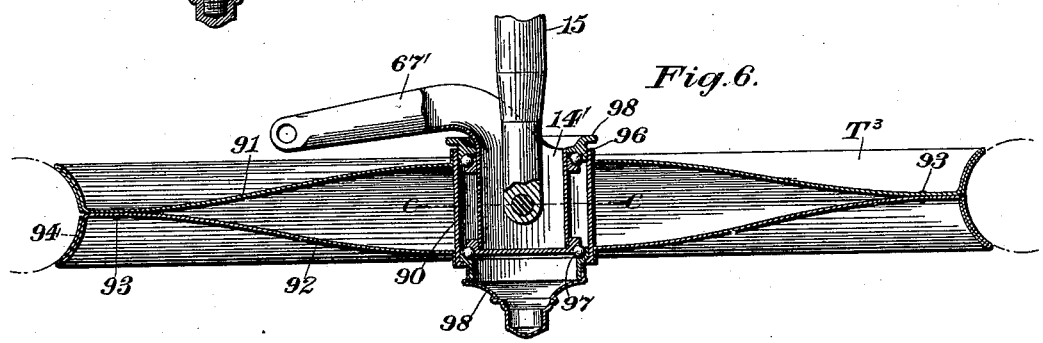
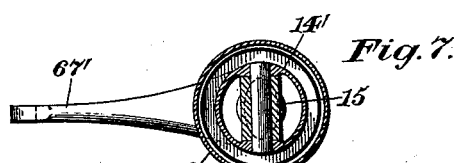
Witnesses:
J. L. Edwards Jr.
Fred. J. Dole.
Inventor:
Hurbert C. Baker.
By his Attorney,
F. A. Richards.

(No Model.) 5 Sheets—Sheet 4.

H. C. BAKER.
MOTOR VEHICLE.

No. 583,018. Patented May 25, 1897.

Witnesses:
J. L. Edwards Jr.
Fred. J. Dole.

Inventor:
Hurbert C. Baker.
By his Attorney,
F. H. Richards.

(No Model.) 5 Sheets—Sheet 5.

H. C. BAKER.
MOTOR VEHICLE.

No. 583,018. Patented May 25, 1897.

Witnesses:
J. L. Edwalds Jr.
Fred. J. Dole.

Inventor:
Hurbert C. Baker.
By his Attorney,
F. H. Richards.

UNITED STATES PATENT OFFICE.

HURBERT C. BAKER, OF HARTFORD, CONNECTICUT.

MOTOR-VEHICLE.

SPECIFICATION forming part of Letters Patent No. 583,018, dated May 25, 1897.

Application filed June 27, 1896. Serial No. 597,212. (No model.)

*To all whom it may concern:*

Be it known that I, HURBERT C. BAKER, a citizen of the United States, residing in Hartford, in the county of Hartford and State of Connecticut, have invented certain new and useful Improvements in Motor-Vehicles, of which the following is a specification.

This invention relates, generically, to vehicles of that class known as "motor-vehicles," or vehicles in which the propelling power is furnished by a suitable motor carried by and constituting a part of the vehicle, and which motor is operated by gas, electricity, or any other suitable motive agent; and the invention relates more specifically to the running-gear, including the starting, stopping, driving, and reversing and steering instrumentalities of the vehicle.

One object of my present invention is to furnish an improved vehicle of the class specified embodying a propelling-motor and a suitable traction-wheel, and also embodying means whereby the velocity and the direction of rotation of the traction-wheel may be arbitrarily changed without altering the speed or direction of rotation of the motor-shaft, and whereby the rotative movement of the traction-wheel may be arbitrarily interrupted and the vehicle stopped without interrupting the rotation of the motor-shaft.

A further object of this invention is to provide, in connection with a pair of traction-wheels of a motor-vehicle, traction-wheel supporting and actuating instrumentalities, the constructions and organizations of which are such that both wheels will have a unitary rotative movement of corresponding peripheral velocities when the line of traction is straight or when the vehicle is moving in a straight path, and will have independent movements of relatively different peripheral velocities, according to the extent of deflection or curvature of the line of traction when the vehicle is making a turn or is moving in a curved path, to thereby obviate, in a great measure, torsional stress and injurious slippage.

A further object of the invention is to provide, in connection with a driving mechanism of a motor-vehicle, a shiftable speed-controller, and to provide, in connection with the speed-controller, a controller-actuator operable for shifting the speed-controller to different positions for increasing or decreasing the speed and nullifying the effective operation of the driving mechanism, and embodying means for normally locking the actuator in a position to nullify the effective operation of the driving mechanism and having means in connection therewith for automatically returning the actuator to this nullifying position if released by the hand of the operator.

A further object of this invention is to provide in a vehicle of the class specified improved steering instrumentalities, the construction and organization of which are such that the steering-wheels may be simultaneously set at different angles corresponding to the difference in the length of the radius of the arc described by said wheels in turning corners or in deflecting from a line parallel to the longitudinal axis of the vehicle.

A further object of the invention is to so construct and organize the steering instrumentalities of the vehicle that the steering-axle, while held against movement horizontally, may have an oscillatory movement at its opposite ends in a vertical direction, and whereby the steering-wheels, while supported to have movement in a vertical direction with the axle, are also supported to swing on a vertical axis intersecting the plane of said axle, thereby affording means for enabling the vehicle to make short turns without a horizontal swinging movement of the steering-axle.

Figure 2:
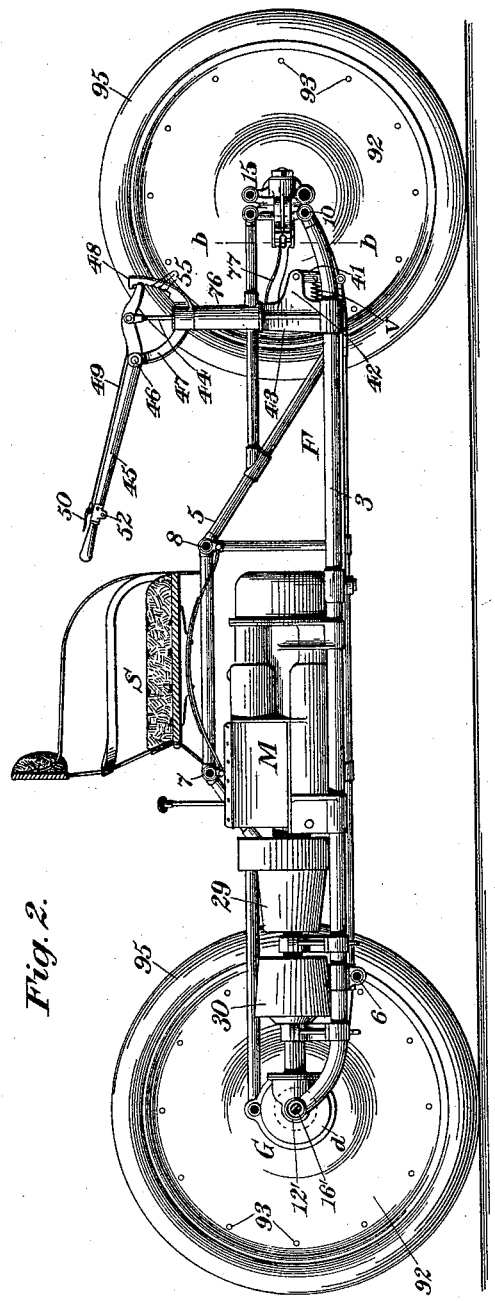
Figure 3:
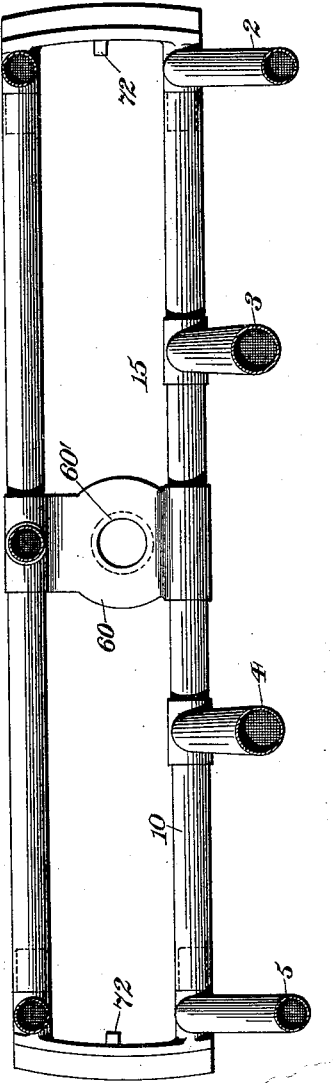
Figure 8:
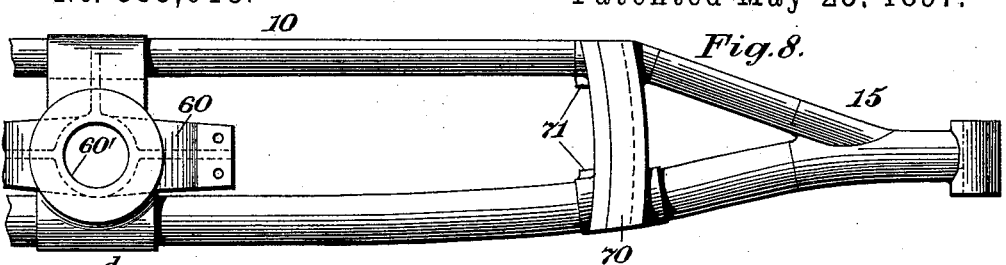
Figure 9:
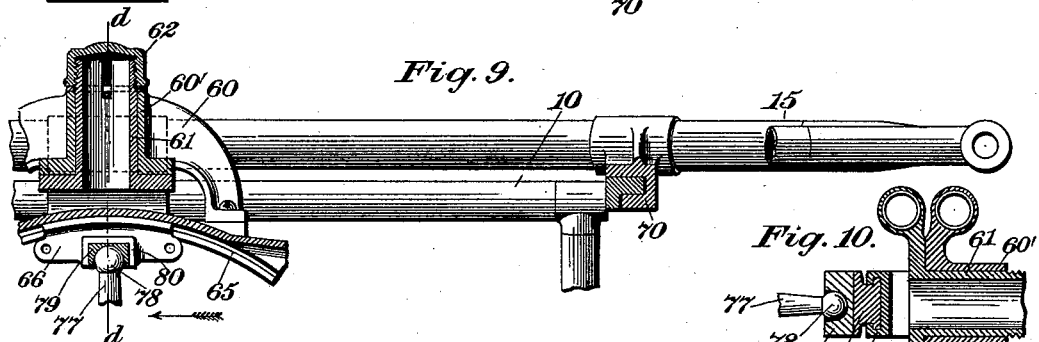
Figure 10:
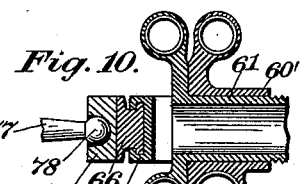
Figure 11:
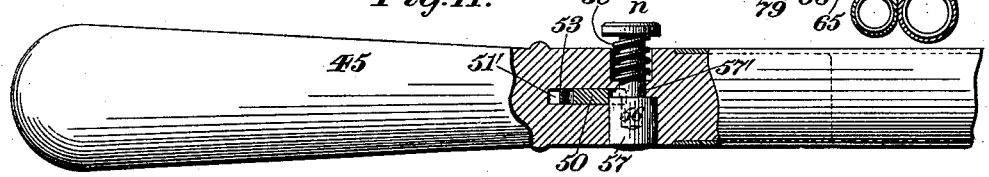
Figure 12:
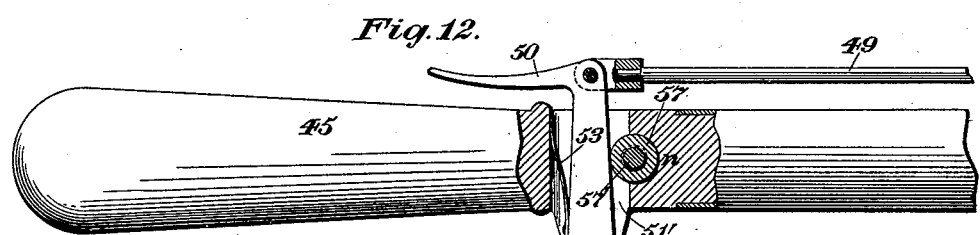
Figure 14:
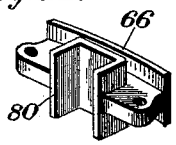
Figure 13:
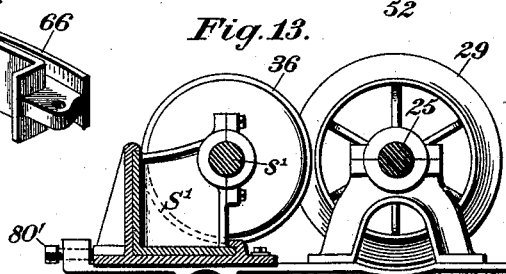
Figure 15:
Figure 16:
Figure 17:
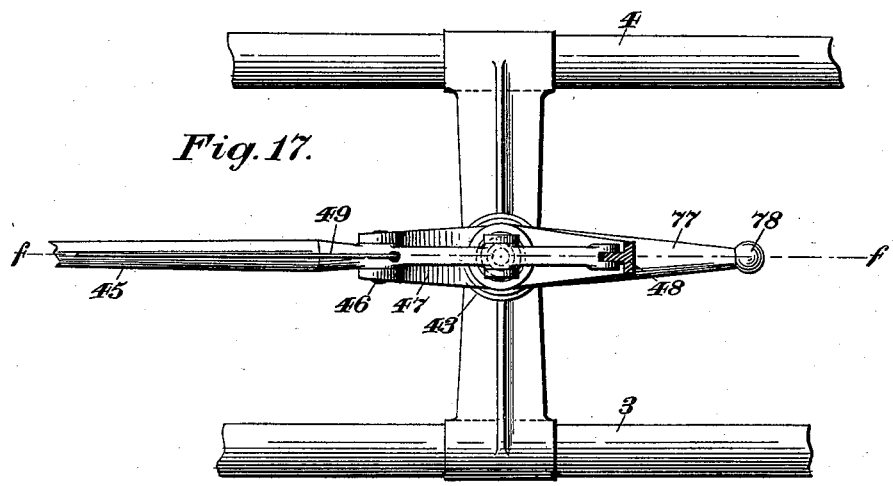
Figure 18:
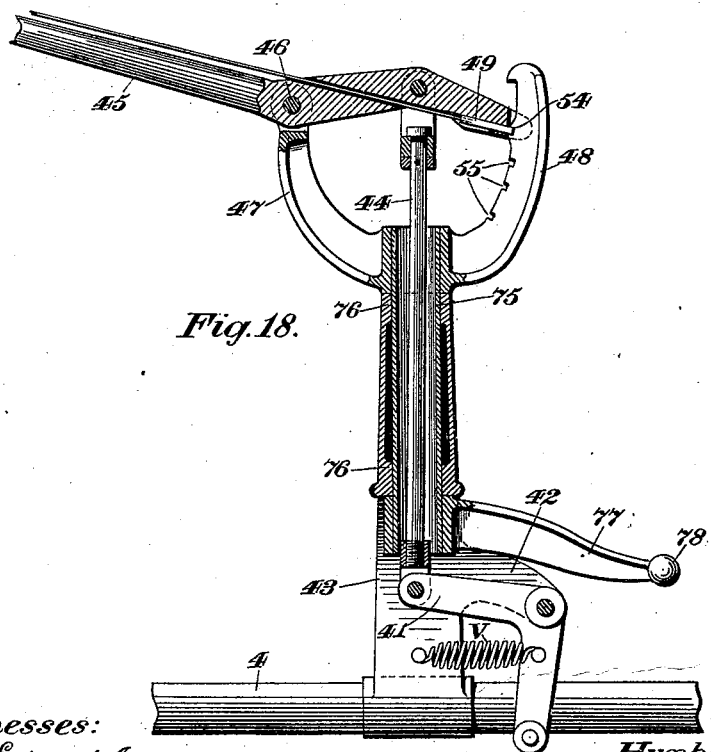

In the drawings accompanying and forming part of this specification, Figure 1 is a plan view of the motor-vehicle with the foot-board removed and with the seat represented by dotted lines, said figure showing in full and dotted lines two positions, respectively, of the steering-wheels. Fig. 2 is a vertical longitudinal section of the motor-vehicle, taken in line *a a*, Fig. 1, as seen from the under side in said figure. Fig. 3 is a vertical cross-sectional view, on a relatively large scale, of a portion of the front end of the main frame of the vehicle, said section being taken on a line corresponding to the dotted line *b b*, Fig. 2. Fig. 4 is a horizontal section, on a relatively large scale, of a portion of the traction-wheel actuating and controlling mechanisms, said figure showing a portion of one traction-wheel, traction-wheel shaft, a portion of the motor-shaft, and connecting and actuating instrumentalities between the motor-shaft and traction-wheel shaft. Fig. 5 is a side view, on a relatively small scale as compared with Fig. 4, of a portion of the traction-wheel-driving mechanism and the shiftable speed-controller, said figure representing by radial lines three different positions of the speed-controller. Fig. 6 is a horizontal cross-section of one of the steering-wheels and a portion of its supporting and actuating instrumentalities. Fig. 7 is a vertical cross-sectional view taken in line $c\ c$, Fig. 6, of the hub portion of a steering-wheel, as seen from below in said Fig. 6. Fig. 8 is an elevation of a portion of the steering-wheel carrier or axle as seen from the left hand in Fig. 1, said figure showing the pivot-block in which the horizontal pivot of the main frame of the vehicle is supported when the parts are assembled as shown in Fig. 9. Fig. 9 is a sectional plan view of a portion of the steering-axle and a portion of the main frame, showing the parts assembled in working relation. Fig. 10 is a cross-sectional view taken in a line corresponding with the line $d\ d$, Fig. 9, and showing the shiftable connections between the steering-axle and main frame of the vehicle. Fig. 11 is an enlarged plan view, partially in section, of a portion of the hand-lever which actuates and controls the movements of the speed-controlling device. Fig. 12 is a sectional side elevation of that part of the lever shown in Fig. 11. Fig. 13 is a cross-sectional view, on a relatively large scale, of a portion of the driving mechanism and shiftable speed-controller, said section being taken on a line corresponding to the line $e\ e$, Fig. 1, and showing the parts as viewed from the left hand in said figure. Fig. 14 is a perspective view of the slide which controls the angular positions of the steering-wheels. Fig. 15 is a perspective view of the block which, when the parts are assembled, is shiftably supported in a guideway of the slide shown in Fig. 14. Fig. 16 is a plan view of a lock-washer used in connection with the nut that holds the steering-axle and main frame in operative relation, as shown in Fig. 9. Fig. 17 is a plan view, on a relatively large scale, of a portion of the front end of the main frame, showing the steering and speed-controller-actuating lever and accessories. Fig. 18 is a vertical cross-section, taken in line $f\ f$, Fig. 17, and showing the parts illustrated in said Fig. 17.

Similar characters designate like parts in all the figures of the drawings.

In the preferred embodiment of the invention herein shown and described the motor-vehicle as a whole comprises an oblong frame, which may be of any suitable general construction adaptable for carrying the fixed and movable parts of the vehicle, two traction-wheels mounted upon a divided or two-part shaft or driving-axle, which is journaled in suitable bearings connected with and is disposed transversely of one end of the vehicle-frame, two steering-wheels shiftably supported on a steering axle or carrier, which is pivotally connected, for oscillation in a vertical direction, upon the opposite end of the vehicle-frame, a suitable motor supported on the vehicle-frame and having a motor-shaft, an equational train of gears, or equational box, operatively connecting the adjacent ends of the two parts or members of the traction-wheel shaft, driving and controlling mechanism operatively connecting the motor-shaft and the equational train of the traction-wheel shaft and embodying a reversing driving device, and also embodying a shiftable speed modifier or controller in operative relation with the reversing driving device and adapted for controlling the direction of rotation of and for effecting an increase or decrease in the speed of the traction-wheel shaft, and also operative for nullifying the effective operation of the driving device, means for actuating the speed-modifier to change the speed of the traction-wheel shaft with relation to the motor-shaft and for arbitrarily nullifying the effective action of the driving device without affecting the rotation of the motor-shaft, and also operable for locking the traction-wheel shaft against rotative movement, and means, preferably controlled by said speed-modifier-actuating means, for changing the angular relation of the steering-wheels relatively to the longitudinal axis of the vehicle-frame.

The vehicle-frame, which is designated in a general way by F, and which will preferably be constructed of metal tubes so disposed and connected as to form a rigid structure, may properly comprise a series of longitudinally-disposed tubular sills or beams, (herein shown as four in number and designated by 2, 3, 4, and 5, respectively,) the outer sills 2 and 5 of which are shown connected together, between the extreme ends thereof, by cross-ties 6, 7, 8, and 9, respectively, and the extreme outer ends of which sills are shown connected by a tubular end sill 10 at one end and at the opposite end by a tubular traction-shaft sleeve, which is transversely divided to form two axially-alined shaft-supporting members 12 and 12'.

The two side sills 2 and 5 are shown arched at their middle portion, where they are connected by the cross-ties 7 and 8, to furnish a convenient elevated support for a suitable seat S, which is shown resting upon springs shackled to the cross-ties 7 and 8. The intermediate sills 3 and 4 are shown of relatively large diameters as compared with the sills 2 and 5. These sills 3 and 4 extend somewhat below the arched portion of the sills 2 and 5 and are connected to said sills 2 and 5 by hanger-tubes (not shown) and are also connected to the end sill 10 and to the two-part tubular shaft-sleeve 12 12' by suitable connections, as shown most clearly in Figs. 2 and 3 of the drawings.

The traction-wheels of the vehicle, which are designated by T and T', respectively, and which are located one at each side of the frame F, are carried at the ends of a traction axle or shaft, (designated in a general way by D,) which shaft is journaled in suitable bearings in the traction-shaft sleeves or tubular members 12 and 12', and the steering-wheels, which are designated by T² and T³, respectively, are rotatably supported upon spindles 14 and 14', pivotally mounted for horizontal movements upon the ends of a steering-axle or axletree 15, which in turn is pivotally mounted for vertical oscillation upon the end sill 10 of the frame F, all of which will be hereinafter more particularly described.

For the purpose of affording means whereby the traction-wheels T and T' may have independent rotative movements of relatively varying velocities, as is necessary to prevent slippage when the vehicle is moving in a curved path, said variation in the velocities of the two wheels being due to differences in tractional resistance, as is well known, the traction axle or shaft is transversely divided near the middle portion thereof to form two independent shaft members or wheel-carrying spindles 16 and 16', respectively, and the two traction-wheels T and T' are preferably fixed one to the outer end of each shaft member or spindle, as shown most clearly in Figs. 1 and 4 of the drawings, each shaft member being shown supported at opposite ends thereof in suitable antifriction-bearings in each of the two parts 12 12' of the traction-shaft sleeve or case, said sleeve preferably constituting a fixture of the vehicle-frame F, as before stated, and for the purpose of affording means whereby the two traction-wheels T and T' may be synchronously rotated in corresponding directions and with corresponding velocities, as is required when the vehicle is moving in a straight path, I have provided, in connection with the adjacent ends of the two members 16 and 16' of the traction-shaft, an equational box or differential driving-connector (designated in a general way by G) the parts of which are so constructed and organized as to enable the two shaft members 16 and 16', that carry the traction-wheels T and T', to have rotative movements of corresponding or relatively different velocities, according as the traction-wheels meet with the same or relatively varying tractional resistances.

The equational box G, which constitutes a differential driving-connector between the two shaft members or traction-wheel-carrying spindles 16 and 16' and which is shown in a general way similar to equational boxes of the ordinary type, comprises in the preferred form thereof shown in the drawings a drum or gear-case c, located within a suitable casing d, which preferably constitutes a part of the vehicle-frame F and which gear-case is journaled for rotative movement upon the adjacent ends of the two shaft members 16 and 16' and having a beveled gear 17 in concentric relation with said shaft members, two oppositely-disposed bevel-gears 18 and 18', of corresponding diameters fixed to the ends of the shaft members 16 and 16', respectively, within the gear-case c, two oppositely-disposed duplicate bevel-gears or idle-wheels 19 and 19', journaled upon the opposite ends 20 and 20' of a carrier mounted in the gear-case c, which bevel-gears 19 and 19' mesh at opposite sides with the bevel-gears 18 and 18' and have their axes of movement coincident with each other and at right angles to the axis of movement of the two gears 18 and 18', and a driving bevel-gear 21, fixed to an equational-box-actuating shaft 22, journaled in a suitable bearing 23 on the frame F of the vehicle, which shaft 22 will be driven and controlled in its movements by suitable mechanism hereinafter fully described.

For the purpose of equalizing wear of the parts of the differential driving-connector G said connector is shown having two idle-wheels 19 and 19', but it will be obvious that one of said gears might be dispensed with without effecting any change in the operation of the two shaft members 16 and 16'.

In the form thereof herein shown and described the driven and driving gears 17 and 21, respectively, are of such relative diameters that they will effect a two-to-three ratio of movement between the gear-case c and the actuating-shaft 22.

By supporting the traction-wheels T and T' upon independent spindles or shaft members, as 16 and 16', and operatively connecting these two spindles or shaft members together by an equational box or a differential driving-connector, such as herein shown and described, the traction-wheels T and T' will, when the tractional resistance of both wheels is the same, as will be the case if the vehicle is moving in a straight line, be rotated in unison at corresponding peripheral velocities, whereas, on the contrary, an increased tractional resistance upon one wheel will retard the peripheral velocity of this wheel and proportionately effect an acceleration in the peripheral velocity of the other wheel, the organization of mechanism being such, as will be readily understood by reference to Fig. 4 of the drawings, that the traction-wheels may have rotative movements of relatively varying velocities, while the sum of the velocities of the two wheels remains unchanged, or, in other words, the combined rotative movements of the two traction-wheels and the rotative movement of the driving-shaft 22 is constantly maintained at a predetermined ratio.

By reference to Fig. 4 of the drawings it will be understood that the planet-gears or idle-gears 19 and 19' make two revolutions to three rotations of the shaft 22, and that the bevel-gears 18 and 18', which are fixed to the traction-wheel spindles 16 and 16', respectively, will, if the tractional resistance of both traction-wheels T and T' is the same, rotate in the same direction at velocities corresponding to the orbital velocities of the idle-wheels 19 and 19'. On the other hand, any reduction in the peripheral velocity of one traction-wheel due to an increased tractional resistance will result in a corresponding increase in the velocity of the other traction-wheel. This construction and organization of driving-connector between two traction-wheels affords a simple and effective means for securing the relative variations in peripheral velocities of said wheels necessary to obviate slippage of and injurious torsional stress on the traction-wheels when the vehicle is moving in the arc of a circle.

The primary actuating means for the vehicle is shown as a motor, (designated in a general way by M,) which is shown supported upon the intermediate sills 3 and 4 of the vehicle-framework, said motor having a power-shaft 25 in axial alinement with the equational-box-actuating shaft 22. This motor, which may be of any suitable type for rotating the power or motor shaft 25 at the requisite speed, will preferably be similar, in a general way, to the gas-motor shown and described in Letters Patent of the United States No. 563,249, granted to me July 7, 1896, to which reference may be had. This motor, assuming it to be an explosive gas-motor such as described in the patent referred to, may be supplied with volatile liquid hydrocarbon through an induction-pipe (not shown) and will be provided with suitable speed-controlling devices.

Inasmuch as the particular construction and organization of the parts of the motor of the vehicle are not essential features of my present invention and as any suitable motor may be employed for operating the shaft 22, a detailed description of the construction, organization, and operation of the parts of the motor is deemed unnecessary to the understanding of my present invention, it being sufficient for this purpose to say that the motor will preferably be of the "high-speed" type and of a horse-power adapted for rotating the shaft 25 at the requisite velocity to secure the best results in propelling the vehicle.

In vehicles of the class specified it is of material importance that means independent of the primary motive factor be provided whereby the rate or running speed of the vehicle may be quickly increased or decreased or completely nullified arbitrarily and whereby the direction of rotation of the traction-shaft may be readily changed without effecting any change in the direction of rotation of the power-shaft of the primary motive factor; and for this purpose I have provided, in connection with the motor-shaft 25 and the shaft 22, that drives the traction-shaft, driving, reversing, and speed-controlling mechanism, which is designated in a general way by R and which operatively connects these two shafts 25 and 22, respectively. This reversing, driving, and speed-controlling mechanism in the preferred form thereof herein shown and described comprises two independent conical friction-drums 29 and 30 of relatively different diameters, the smaller one, 29, of which is fixedly secured to the motor or power shaft 25 and the larger one, 30, of which is supported at its opposite ends for rotative movement upon the adjacent ends of the two shafts 22 and 25, said conical friction-drums being set in concentric relation with said two shafts and having their apexes or their diametrically-reduced ends in adjacent relation; two oppositely-disposed bevel-gears 31 and 32 of corresponding diameters fixed, respectively, to the ends of the shafts 22 and 25; two oppositely-disposed idle-gears 33 and 34 of diameters corresponding to the diameters of the bevel-gears 31 and 32 and meshing with said bevel-gears at opposite sides thereof and which idle-gears are journaled, respectively, upon the opposite ends of a carrier supported in bearings in a gear-case 35, which constitutes a fixed part of the conical friction-drum 30; a shiftable speed-modifier consisting of a slide (designated in a general way by S') shiftably supported in a slideway on the vehicle-frame F; a shaft s', journaled for rotation in bearings in said slide, and two friction rolls or wheels 36 and 37 in peripheral engagement with the two drums 29 and 30, respectively.

By reference to Fig. 4 of the drawings it will be seen that the differential train comprised in gears 31, 32, 33, and 34 constitutes a reversing driving-connector between the two shafts 22 and 25, and that the conical drums 29 and 30, in conjunction with the friction-rolls 36 and 37 and their carriers, constitute speed-modifying instrumentalities for controlling the speed of shaft 22 with relation to the speed of the motor-shaft 25.

The friction-rolls 36 and 37 are, in the present instance, shown of relatively different diameters and carried by a two-part shaft, the parts of which shaft are coupled together by a universal joint or coupling, the friction-roll 36 being of a diameter substantially equal to the diameter of one cross-sectional part of the friction-drum 29, by which it is rotated, and the friction-roll 37 being of a diameter equal to one-half of the diameter of one cross-sectional part of the friction-drum 30, that is controlled in its movements by said friction-roll.

The relative diameters of the friction-drums and their respective friction-rolls and the relative arrangement of said friction drums and rolls are shown in the drawings to be such that when the friction-rolls are in the position shown in Figs. 1 and 4 the friction-drum 30 will be so held by the friction-roll 37 that this drum 30 and the drum 29 will have a one to two ratio of movement, the drum 30 rotating at one-half the speed of drum 29, and when in this position—which may be consistently called the "stopping" position and which is designated by "stop" in the diagrammatic view Fig. 5—the orbital and rotative movements of the idle-gears 33 and 34 countervail each other, causing said gears to have no rotative effect upon the bevel-gear 31, fixed to the shaft 22, thus holding said shaft at rest, whereas, on the contrary, if the friction-rolls 36 and 37 are shifted toward the extreme right-hand positions (designated by $r$, Fig. 5) this will result in the friction-drum 30 being rotated with a gradual increasing velocity in what might be termed a "forward" direction, and if the friction-rolls are shifted toward their extreme left-hand positions (designated by $l$ in said figure) the drum 30 will be rotated with a gradual decreasing velocity, thus causing the shaft 22 to rotate in a reverse or backward direction. Thus it will be seen that by moving the friction-rolls 36 and 37, which are in constant engagement with the drums 29 and 30, longitudinally of said drums and in one or the other direction described the velocity of the shaft 22 may be increased or decreased and the direction of rotation of said shaft may also be changed, as will be readily understood by comparison of Figs. 1, 4, and 5 of the drawings.

In the organization of speed-modifying instrumentalities herein shown and described the sliding carrier for the friction-rolls is supported to have a shifting movement in the arc of a circle, and the peripheries of the friction-drums are curved longitudinally to correspond to the arc traversed by the peripheries of the friction-rolls 36 and 37. In such case it is advantageous to construct the friction-roll-carrying shaft in two parts and connect said parts by a universal coupling to adapt the same to the curvature of the peripheries of the friction-drum, but it will be obvious that the construction and general organization of the speed-modifying instrumentalities may be changed without departure from my present invention.

For convenience the friction-roll-carrying slide and the friction-rolls, which directly control the relative movements of the friction-drums 29 and 30, will be hereinafter referred to as the "shiftable speed-modifier."

The speed-modifier is shown connected by means of a connecting-rod 40 to one arm of a bell-crank 41, pivotally supported upon an arm 42 of an upright or post 43, secured to the intermediate sills of the vehicle-frame, and which bell-crank is connected at its opposite end to the lower end of an actuating-rod 44, which is pivotally connected at its upper end to a hand-lever 45, fulcrumed at 46 upon an arm 47 of a hand-lever-supporting bracket carried at the upper end of the upright or post 43, and as a convenient means for arbitrarily setting and holding the modifier-actuating lever in different positions the lever-carrying bracket is furnished with a curved arm or sector 48, having lock-notches in concentric relation with the fulcrum of the actuating-lever or hand-lever 45, and the hand-lever is furnished with a shiftable spring-actuated bolt 49, the outer end of which is adapted for engaging in lock-notches formed in the inner face of the curved arm 48. This bolt is shown connected at its inner end with a thumb-lever 50, by means of which the same may be retracted. This thumb-lever is shown extended through a vertical opening 51' in the hand-lever 45 and is pivoted to said lever, as shown at 52, Fig. 12 of the drawings, said bolt being normally held in its lock-notch-engaging position by means of a spring 53, bearing against the thumb-lever 50.

For the purpose of insuring the engagement of the bolt 49 with a lock-notch when the lever arrives at a position for setting the speed-controller in its stopping position the arm 48 has one lock-notch 54, located in advance and out of the plane of the other lock-notches 55, and the bolt 49 is normally limited in its advancing movement, so that while it will normally engage in the lock-notch 54 it will freely pass the lock-notches 55 without engaging in said notches, or, in other words, the lock-bolt is settable to two positions in an advanced direction, one for engaging in the lock-notch 54 and the other for engaging in the lock-notches 55, and as a means for limiting the advancing movement of the bolt, so that the same will be free to clear the lock-notches 55 without engagement therewith and at the same time facilitate the engagement of said bolt with the lock-notch 54, I have provided, in connection with the hand-lever 45, a shiftable bolt-limiting device, (designated in a general way by $n$,) which in the form thereof shown most clearly in Figs. 11 and 12 of the drawings consists of a push-pin 56, supported in a transverse opening intersecting the plane of movement of the thumb-lever 50 and having two portions 57 and 57' of relatively different diameters, the enlarged portion 57 of which normally engages the front face of the thumb-lever, as shown in Figs. 11 and 12, and holds the lever, so that the bolt 49 will engage in the lock-notch 54 only and will freely pass the other lock-notches 55. The push-pin is normally held in the position shown in Fig. 11 by means of a spiral spring 58, which surrounds the stem of the push-pin 56 and is located between the head of said push-pin and a shoulder on the hand-lever, as will be readily understood by reference to said figure.

When it is desired to engage the lock-bolt with one of the notches 55, the push-pin 56 will be pressed inward sufficiently to bring the portion 57 into juxtaposition with the thumb-lever 50, thus permitting said lever to advance sufficiently to enable the lock-bolt to engage in said notches 55.

As a means for automatically retracting the hand-lever to lock the same in its vehicle-stopping position I have provided a retracting device V, which, in the form thereof herein shown, consists of a spring secured to one end at the bell-crank 41 and at its opposite end to the upright or post 43. This forms a convenient means for automatically stopping the vehicle in case the speed-modifier-actuating lever 45 is tampered with, or in case the operator from any reason loses control of said lever.

As a convenient means for supporting the steering-wheels, so that the angular relation of said wheels may be changed to correspond to the arc described when the vehicle is run in a curved path and at the same time hold the steering-axle against horizontal movement, the steering-axle 15 is furnished midway between the ends with a bracket 60, having a horizontal pivot-bearing 60', in which is rotatably seated a horizontal pivot 61, secured to the middle portion of the front sill of the vehicle-frame F, these parts being held in operative relation by a nut 62, secured to and locked against rotative movement on the pivot 61, and the steering-wheels $T^2$ and $T^3$, respectively, are rotatably mounted on spindles 14 and 14', which are in turn pivotally secured for horizontal oscillation on the ends of the steering-axle 15, as will be readily understood by a comparison of Figs. 1 and 6 of the drawings. These spindles are shown of tubular construction and are pivotally connected with the opposite ends, respectively, of the steering-axle at points central between the opposite end of the hubs of the steering-wheels, this construction and organization affording means whereby the steering-wheels may have rotative movements in transverse directions upon intersecting axes, respectively.

As a means for changing the angular relations of the two steering-wheels to the proper degrees necessary to facilitate the movement of the vehicle in a curved path without cramping the bracket 60 is furnished with a curved guide 65, on which is mounted a steering-wheel-actuating slide 66, which is connected by means of actuating-rods 68 and 68' to the angularly-disposed arms 67 and 67' of the wheel-supporting spindles 14 and 14'.

For the purpose of setting and holding the steering-axle in operative relation with the vehicle-frame F said axle is provided near each end thereof with a transversely-disposed slide 70, which engages a guide 70' at the end of the front sill of the vehicle-frame, as shown most clearly in Fig. 9, abutments 71 being provided for limiting the vertical movement of the axle with relation to the vehicle-frame, said abutments engaging a stop 72 (see Fig. 3) on the frame for this purpose.

The radius of the guide for the steering-wheel-actuating slide will be of a proper length and the position of said slide with relation to the wheel-spindles and the spindle-pivots will be such as to secure the requisite difference in the degrees of the angles of the two steering-wheels $T^2$ and $T^3$, which will be readily understood by any one skilled in the art to which this invention appertains.

As a convenient means for shifting the slide 66 to change the angular relation of the two steering-wheels $T^2$ and $T^3$, and to do this through the medium of the same lever that actuates the speed-modifier, I have shown the bracket which carries the hand-lever 45, having a tubular rock-shaft or stem 75, which is journaled for rotation in the bearing 76 on the bracket-supporting post or upright 43, and said rock-shaft is provided at the end thereof with a laterally-projecting arm 77, having a ball 78 at the outer end, which is seated in a block 79, supported for vertical movement in a slideway 80 on the steering-wheel-actuating slide 66. The rock-shaft 75 is shown hollow to receive and permit a slight lateral movement of the rod 44, which connects the working end of the lever 45 and the bell-crank 41.

From the foregoing description it will be seen that the hand-lever 45 constitutes a simple and effective means for arbitrarily regulating the speed of the vehicle and also for changing the angular relations of the steering-wheels to control the movements of said vehicle. It will be obvious, however, that two independent means might be provided for effecting these ends, and therefore I do not desire to limit this invention to the particular construction and organization of mechanism herein shown and described for these purposes.

By supporting the steering-axle so that the same may have vertical movements at opposite ends thereof and by supporting the steering-wheels upon independent spindles and pivoting these spindles to the opposite ends of the axle, so that said wheels may be swung horizontally sidewise in a true circle on an axis that extends at right angles to the axis of rotative movement of said wheels, I am not only enabled to secure the proper angular deflection of said wheels necessary to facilitate the movements of the vehicle in the arc of a circle, but I am also enabled to run the steering-wheels in different planes vertically without affecting the horizontal plane of the vehicle-frame, which in the class of vehicles specified is of material importance, as it obviates a rocking motion of the bed of the vehicle incidental to traveling over uneven surfaces.

As a means for regulating the stress of the friction-rolls 36 and 37 upon the conical drums 29 and 30, respectively, I have provided, in connection with the bracket which carries the slide of the shiftable friction-roll carrier, means for shifting said rolls toward and away from the friction-drums. This means, in the preferred form thereof shown, comprises improved set or adjusting screws 80', (see Figs. 1 and 13,) which have screw-threaded bearings in bosses on the framework which supports these parts and which screws bear at their inner ends against said bracket.

The operation of the hand-lever which controls the speed of the vehicle and relative positions of the steering-wheels will be readily understood by a comparison of Figs. 2, 17, and 18 of the drawings.

When it is desired to start the vehicle, assuming the motor to be running and the hand-lever 45 to be in the position shown in Fig. 2, it is simply necessary to press down the thumb-piece or thumb-lever 50, which releases the bolt 49 from the lock-notch 54, after which the inner end of the lever 45 may be elevated, which in turn shifts the speed-modifier from the position shown in Fig. 4 toward the right-hand position, (designated by $r$,) and through the driving mechanism effects a forward movement of the vehicle, the velocity of which is gradually increased as the speed-modifier is moved in this direction. If the hand-lever is accidentally released after the bolt has been withdrawn from the lock-notch 54, the retracting device V will return said lever to its normal vehicle-stopping position.

In the preferred form thereof (shown most clearly in Fig. 6 of the drawings) each steering-wheel comprises a tubular hub 90 and two metal disks 91 and 92, having flanged central openings whose diameters correspond to the external diameter of the hub. These disks are secured to said hub at opposite ends, respectively, thereof and are bent inwardly and riveted together near the peripheries thereof, as shown at 93, their peripheries being curved outward to form a concaved rim 94 for receiving a pneumatic tire 95, as shown in Figs. 4 and 6. Each steering-wheel is supported at opposite ends of its hub by ball-bearings 96 and 97, located between said hub member 90 and the tubular spindle member which supports the hub, the wheel being held upon the spindle in any suitable manner, a dust-guard 98 being located between the spindle and the hub of the wheel at the inner end thereof, as shown in said Fig. 6.

Having described my invention, I claim—

1. The combination with a frame having guideways on the sides thereof, of an axle supported on said frame for vertical oscillatory motion; slides carried by the axle and engaging said guideways; a stop for limiting the vertical movement of the axle and wheels supported for horizontal movement on said axle.

2. The combination with a frame having guideways, of an axle supported on said frame for vertical oscillatory movement; curved slides carried by the axle and engaging said guideways; a stop for limiting the vertical movement of the axle; and wheels supported for horizontal movement on said axle.

3. The combination with a frame having guideways, of an axle supported on said frame for vertical oscillatory motion; slides having abutments for limiting the vertical motion of the axle and carried by said axle; a stop; and wheels supported for horizontal movement on the axle.

4. The combination with a vehicle-frame and with an axle having a horizontal pivotal connection with said frame, of wheel-supporting spindles pivotally supported for horizontal movement at opposite ends of said axle and having laterally-disposed arms; wheels rotatably mounted on said spindles; a wheel-shifting slide in operative connection with the arms of the spindles and supported for movement in the arc of a circle; and means for actuating said slide to simultaneously change the angular positions of the wheels relatively to the axle and relatively to each other.

5. The combination with a vehicle-frame and with a vehicle-axle, of two wheels having two relatively transverse intersecting axes of movement; a fixed segmental guide; a shiftable slide supported on said guide and embodying means for controlling the horizontal movements of the wheels; and an oscillatory slide-actuator having a shiftable connection with said slide.

6. The combination with the axle and with the pivoted steering-wheels thereon, of a lever; a movable frame in which said lever is pivoted; an arm projecting from the lower side of said frame and provided with a ball at its outer end; a steering-wheel-actuating slide provided with a slideway; and a block supported for vertical movement in said slideway and having a seat for the reception of the ball on the end of said lever.

7. In a motor-vehicle, the combination with the shiftable speed-modifier, of a hand-lever in operative connection with said modifier; means for locking the hand-lever in different positions; and a retracting device in operative connection with, and automatically operable on the release of the hand-lever for shifting, said hand-lever to a predetermined vehicle-stopping position.

8. In a vehicle of the class specified, two independent axially-alined rotatable axle members; in combination with a differential driving-connector between adjacent ends of said shaft members and comprising two oppositely-disposed bevel-gears fixed one to each shaft member; a planet-gear meshing with said bevel-gears; a gear-case carrying the planet-gear and journaled for rotation upon the shaft members; a driven gear fixed to said gear-case in concentric relation with the shaft members; and an actuating-shaft journaled on the vehicle-frame and having a driving-gear in mesh with the driven gear and effective for rotating said driven gear, arbitrarily, in opposite directions and at different velocities.

9. The combination with a driving and driven shaft supported in axial alinement, of two bevel-gears fixed to the adjacent ends of the two shafts, respectively; a planet-gear meshing with the two bevel-gears; a conical drum loosely mounted on and in concentric relation with the two shafts and carrying the planet-gear; a conical drum fixed to the driving-shaft; two wheels in bearing engagement with the two conical drums and one of which wheels is rotated by the other and is operable for retarding the rotative movement of the planet-wheel-carrying drum; and means for shifting the rolls longitudinally of said drums, to increase or decrease the speed of the driven shaft relatively to the driving-shaft.

10. The combination with a driving and a driven shaft supported in axial alinement, of two conical friction-drums of relatively different diameters, one of which is fixed to the driving-shaft and the other of which is journaled for rotative movement on the driving and driven shafts with its diametrically-reduced end adjacent to the diametrically-reduced end of the other drum; a differential train of gears connecting the adjacent ends of the driving and driven shafts and embodying driven gears controlled in their movements by the rotative movement of the last-mentioned drum; two friction-rolls of relatively different diameters in peripheral engagement, respectively, with the two conical drums and one of which rolls is driven by the other through the medium of the fixed drum; and hand-operated means for shifting the friction-rolls longitudinally of said drums, to increase or decrease the rotative movement of the gear-controlling drum with relation to the fixed drum and arbitrarily stop or reverse the direction of rotation of the driven shaft.

11. The combination with an axle and with steering-wheels thereon, of a lever; a movable frame in which said lever is mounted; an arm projecting from said frame; a steering-wheel-actuating slide having a slideway; and a block supported for movement in said slideway, said block being actuated by said lever.

HURBERT C. BAKER.

Witnesses:
FRED. J. DOLE,
HENRY BISSELL.